United States Patent
Bartminn et al.

(10) Patent No.: US 10,590,620 B2
(45) Date of Patent: Mar. 17, 2020

(54) METHOD FOR CONSTRUCTING A FOUNDATION FOR A TOWER STRUCTURE, AND ONSHORE TOWER STRUCTURE

(71) Applicant: Innogy SE, Essen (DE)

(72) Inventors: Daniel Bartminn, Elmshorn (DE); Benjamin Matlock, Hamburg (DE)

(73) Assignee: INNOGY SE, Essen (DE)

( * ) Notice: Subject to any disclaimer, the term of this patent is extended or adjusted under 35 U.S.C. 154(b) by 0 days.

(21) Appl. No.: 15/577,089

(22) PCT Filed: May 25, 2016

(86) PCT No.: PCT/EP2016/061811
§ 371 (c)(1),
(2) Date: Nov. 27, 2017

(87) PCT Pub. No.: WO2016/189037
PCT Pub. Date: Dec. 1, 2016

(65) Prior Publication Data
US 2018/0179721 A1    Jun. 28, 2018

(30) Foreign Application Priority Data
May 27, 2015    (DE) .................. 10 2015 209 661

(51) Int. Cl.
*E02D 27/42*    (2006.01)
*E02D 5/50*    (2006.01)
(Continued)

(52) U.S. Cl.
CPC .............. *E02D 27/42* (2013.01); *E02D 5/50* (2013.01); *E02D 7/06* (2013.01); *E02D 7/18* (2013.01);
(Continued)

(58) Field of Classification Search
CPC .......... E02D 27/42; E02D 5/50; E02D 27/425; F03D 13/22
See application file for complete search history.

(56) References Cited

U.S. PATENT DOCUMENTS 854,489 A * 5/1907 Gribben .................. E02D 27/42
                                                                    52/169.13
3,793,794 A * 2/1974 Archer .................... E04H 12/12
                                                                    52/115
(Continued)

FOREIGN PATENT DOCUMENTS

DE    20114324    11/2001
DE    10330963    1/2005
(Continued)

OTHER PUBLICATIONS

International Search Report from corresponding PCT Appln. No. PCT/EP2016/061811 dated Jul. 21, 2016.

*Primary Examiner* — Benjamin F Fiorello
(74) *Attorney, Agent, or Firm* — Grossman, Tucker, Perreault & Pfleger, PLLC (57) ABSTRACT

The invention relates to a method for constructing a foundation for a tower structure, comprising at least one structure-side connection profile in the form of a pipe segment. The method has the steps of providing a foundation pile with a diameter which differs from the diameter of the pipe segment, vibrating and/or ramming the foundation pile into a supporting substratum, aligning and fixing the pipe segment coaxially and concentrically to the foundation pile introduced into the substratum such that an annular space is formed between the pipe segment and the foundation pile, and filling the annular space with a curable casting compound.

11 Claims, 5 Drawing Sheets

(51) Int. Cl.
*E02D 7/06* (2006.01)
*E02D 7/18* (2006.01)
*E02D 7/22* (2006.01)
*E02D 7/26* (2006.01)
*F03D 13/20* (2016.01)

(52) U.S. Cl.
CPC .............. *E02D 7/22* (2013.01); *E02D 7/26* (2013.01); *E02D 27/425* (2013.01); *E02D 2250/0023* (2013.01); *F03D 13/22* (2016.05)

(56) References Cited

U.S. PATENT DOCUMENTS

| | | | | |
|---|---|---|---|---|
| 4,779,389 A | * | 10/1988 | Landers | E02D 27/42 405/216 |
| 5,398,478 A | * | 3/1995 | Gordin | E04O 3/30 52/169.13 |
| 8,347,514 B1 | * | 1/2013 | McCollum | G01B 5/14 33/1 G |
| 8,782,978 B1 | * | 7/2014 | Frenette | E04H 12/2269 248/519 |
| 9,663,939 B2 | * | 5/2017 | Seidel | E04B 1/4114 |
| 9,739,027 B2 | * | 8/2017 | Henderson | E02D 27/12 |
| 2006/0185279 A1 | | 8/2006 | Eusterbarkey | |
| 2011/0138731 A1 | * | 6/2011 | Yoshimura | E04H 12/08 52/651.01 |
| 2013/0255169 A1 | * | 10/2013 | Henderson | E04C 5/125 52/223.13 |
| 2014/0126964 A1 | * | 5/2014 | Woo | E02B 17/02 405/226 |

FOREIGN PATENT DOCUMENTS

| | | | |
|---|---|---|---|
| GB | 2475305 | 5/2011 | |
| WO | WO-2005005752 A1 * | 1/2005 | ............ E02D 27/12 |

* cited by examiner

METHOD FOR CONSTRUCTING A FOUNDATION FOR A TOWER STRUCTURE, AND ONSHORE TOWER STRUCTURE

FIELD

The invention relates to a method for constructing a foundation for a tower structure having a structure-side connection profile in the form of a pipe segment or the like.

The invention also relates to an onshore tower structure which has been erected preferably using the aforementioned method.

BACKGROUND

The invention relates, in particular, to a method for constructing a foundation for an onshore tower structure for example in the form of a wind turbine. Wind turbines usually comprise an accessible tower and a nacelle, which is arranged in a rotatable manner on the tower and has a wind-power generator and a rotor. The tower often comprises a number of pipe sections or pipe segments which are flanged to one another. The tower is usually erected on a foundation, wherein foundations for so-called onshore plants, or plants set up on dry land, are surface foundations which consist of concrete and steel. The foundation safeguards the tower or the tower structure against sinking and against falling over. If the tower is not guyed, it is likewise necessary for the transverse forces which occur during operation of the wind-power generator to be absorbed.

It is known for foundations in a comparatively soft foundation soil to be designed in the form of pile foundations. In the case of pile foundations, one or more foundation piles are driven into the foundation soil, for example by introduction by vibration or ramming or in the form of in-situ bored piles.

The tower is often attached to the foundation by a so-called foundation component which may be equipped with a flange connection to a pipe segment of the tower.

It is also known for driven piles or vibrated piles to be provided as part of the foundation, said piles being provided with appropriate connections for fastening the tower structure.

The operation of ramming foundation piles, or of introducing the same by vibration, is basically beset by the disadvantage that any connections provided on said foundation piles have to be designed such that they are not adversely affected by the ramming or vibrating operation. If appropriate, corresponding flange connections have to be welded on subsequently, which involves comparatively high outlay.

SUMMARY

The invention is based on the object of providing a method which is intended for constructing a foundation for a tower structure, in particular for an onshore tower structure, and by means of which a structure-side connection profile can be connected particularly straightforwardly to the foundation.

The invention is also based on the object of providing a corresponding tower structure.

One aspect of the invention relates to a method for constructing a foundation for a tower structure having at least one structure-side connection profile in the form of a pipe segment, wherein the method comprises the following steps:

Supplying one or more foundation piles selected from a group comprising tubular profiles, T-shaped profiles, I-shaped profiles, Z-shaped profiles or other sheet-pile-wall segments, Driving a single foundation pile or a number of foundation piles into a load-bearing foundation soil, wherein the driving-in method is selected from a group comprising introduction by vibration, ramming or drilling or combinations thereof, wherein either a single foundation pile is driven into the foundation soil along a longitudinal axis of the tower structure which is to be erected or a number of foundation piles are driven into the foundation soil along a circular arc arranged coaxially in relation to the longitudinal axis of the tower structure, which is to be erected, Orienting and securing the pipe segment coaxially and concentrically in relation to the foundation pile introduced into the foundation soil or coaxially and concentrically in relation to the arrangement of a number of foundation piles, and Filling the annular space with a settable casting compound.

It is possible for the connection profile or pipe segment to consist of steel, reinforced concrete or polymer concrete or to be designed in the form of a hybrid element made of steel and concrete. The pipe segment need not necessarily have a constant cross section over its height; rather, it may also have a hyperboloidal or conical lateral surface.

It is possible for the foundation pile to consist of steel and to have a cylindrical lateral surface. The latter can have part of its length introduced into the foundation soil by vibration and another part of its length introduced into the foundation soil by ramming. For example, a first part of the length of the foundation pile can be introduced into the foundation soil by vibration and another part of the length thereof can be introduced into the foundation soil by ramming. For introduction by vibration, use is preferably made of a vibrator and, for introduction by ramming, use can be made of a pile driver or a driving ram.

Instead of a single foundation pile with a cylindrical lateral surface, it is possible to provide a number of foundation piles selected from a group comprising tubular profiles, T-shaped profiles, I-shaped profiles, Z-shaped profiles, W-shaped profiles or similarly configured sheet-pile-wall segments. A multiplicity of foundation piles can be driven into the foundation soil for example over a circular arc.

The pipe segment of the tower structure can be secured temporarily, until the casting compound has set to such an extent, and such a connection has been established between the foundation pile and the pipe segment, that the axial and lateral forces of the tower structure can be dissipated into the foundation soil via the casting compound.

The method according to the invention has the advantage that load dissipation can take place exclusively via the casting compound, and therefore the foundation pile can be configured for example without a corresponding connecting flange.

The invention is based on the concept of providing a loadable connection between the structure and foundation exclusively via a settable casting compound, which makes it significantly easier to connect the structure to the foundation. Furthermore, production of the foundation is also simplified. The foundation can be constructed exclusively via one or more foundation piles; there is no need for any special mechanical structures such as, for example, flange or double-flange connections.

The settable casting compound is preferably selected from a group comprising mineral casting compounds, bituminous casting compounds, concretes, polymer concretes, fiber-reinforced polymers, etc.

In the case of an expedient configuration of the method according to the invention, provision is made for the pipe segment to be oriented and secured coaxially and concentrically in relation to a single foundation pile or in relation to the arrangement of foundation piles, such that an annular space is formed between the pipe segment and the foundation pile or the foundation piles, wherein the annular space is filled with the settable casting compound.

In the case of a variant of the method according to the invention, provision is made for the pipe segment to be supported on the foundation pile or the foundation piles prior to the operation of filling the casting compound.

Such support can take place via a multiplicity of supporting brackets which are provided on the pipe segment and via which the pipe segment can be set down on the foundation pile.

Such supporting brackets can be distributed over the inner circumference of the pipe segment.

The pipe segment can have a larger diameter than the foundation pile or the arrangement of foundation piles; as an alternative, the foundation pile can have a larger diameter than the pipe segment.

In the case of a particularly expedient and advantageous configuration of the method, provision is made for a foundation pile of flange-free design to be used. The foundation pile may be designed in the form of a straightforward cylindrical steel-tube segment.

In the case of an advantageous variant of the method according to the invention, provision is made for just a single foundation pile, of appropriate diameter, to be driven into the foundation soil.

In this way, a connection established for the tower structure is a pipe-in-pipe connection, in the case of which the resulting annular space is filled with the casting compound. Surprisingly, it has been found that the surface friction between the casting compound and the pipe segment and the surface friction between the casting compound and the foundation pile is sufficient to establish a load-bearing connection between the pipe segment and the foundation pile.

Any supporting brackets provided within the pipe segment of the tower structure can remain in the latter or be removed again once the casting compound has set.

For the purpose of precise orientation of the pipe segment of the tower structure, provision may be made for the pipe segment, in the region where it is supported on the foundation pile, to have spacers placed beneath it.

In the case of an alternative variant of the method according to the invention, provision may be made for the pipe segment to be supported on the foundation soil prior to the annular space being filled. In this case, there is no need for supporting brackets within the pipe segment. The pipe segment can be set down on the foundation soil for example indirectly via corresponding spacers. The spacers provided may just be compensation elements, so-called shims. As an alternative, the spacers provided may also be hydraulically adjustable supports. The latter would allow a precision adjustment or precision orientation of the pipe segment once it has been set down and prior to and/or during the casting operation.

In the case of an advantageous variant of the method, provision is made for the diameter of the pipe segment to be selected to be larger than the diameter of the foundation pile.

The foundation is preferably constructed onshore.

In the case of an expedient variant of the method according to the invention, provision is made for the pipe segment to be supported on the foundation pile or the foundation piles, for example by means of supporting brackets arranged within the pipe segment, at a distance from the foundation soil. The pipe segment is then expediently positioned on the foundation pile, or the arrangement of foundation piles, such that it surrounds the same from the outside.

The annular space produced between the pipe segment and the foundation pile, or the arrangement of foundation piles, may be sealed, for example, on the side directed towards the foundation soil. The annular space is then filled with casting compound.

For example, it is possible for a pipe segment to be provided with an encircling sealing lip which projects inward on one side and, when the pipe segment is positioned on the foundation pile or the foundation piles, surrounds the foundation pile or the arrangement of foundation piles.

A further aspect of the invention relates to an onshore tower structure, preferably produced using the above-described method, comprising a structure-side connection profile in the form of a pipe segment and a single foundation pile or a number of foundation piles driven into a foundation soil and selected from a group comprising tubular profiles, T-shaped profiles, I-shaped profiles, Z-shaped profiles or other sheet-pile-wall segments, wherein either the pipe segment is supported on a number of foundation piles, or wherein the pipe segment and one foundation pile, or the pipe segment and a number of foundation piles, surround one another to form an annular space, and wherein the pipe segment is at least partially filled with a set casting compound.

There is no need for the pipe segment to have a constant diameter; rather, it may have a cylindrical, conical or hyperboloidal lateral surface.

The pipe segment can be positioned on the foundation pile, or on the arrangement of foundation piles, such that it is fastened on the foundation pile or on the foundation piles at a distance from the foundation soil.

The pipe segment can be supported on the foundation pile or the foundation piles for example via supporting brackets, wherein the supporting brackets are provided only for temporary load dissipation into the foundation pile, or into the foundation piles, or into the foundation soil.

The foundation pile is expediently of flange-free design.

BRIEF DESCRIPTION OF THE DRAWINGS

The invention will be explained herein below with reference to the exemplary embodiments illustrated in the accompanying drawings, in which.

DETAILED DESCRIPTION

Figure 1:
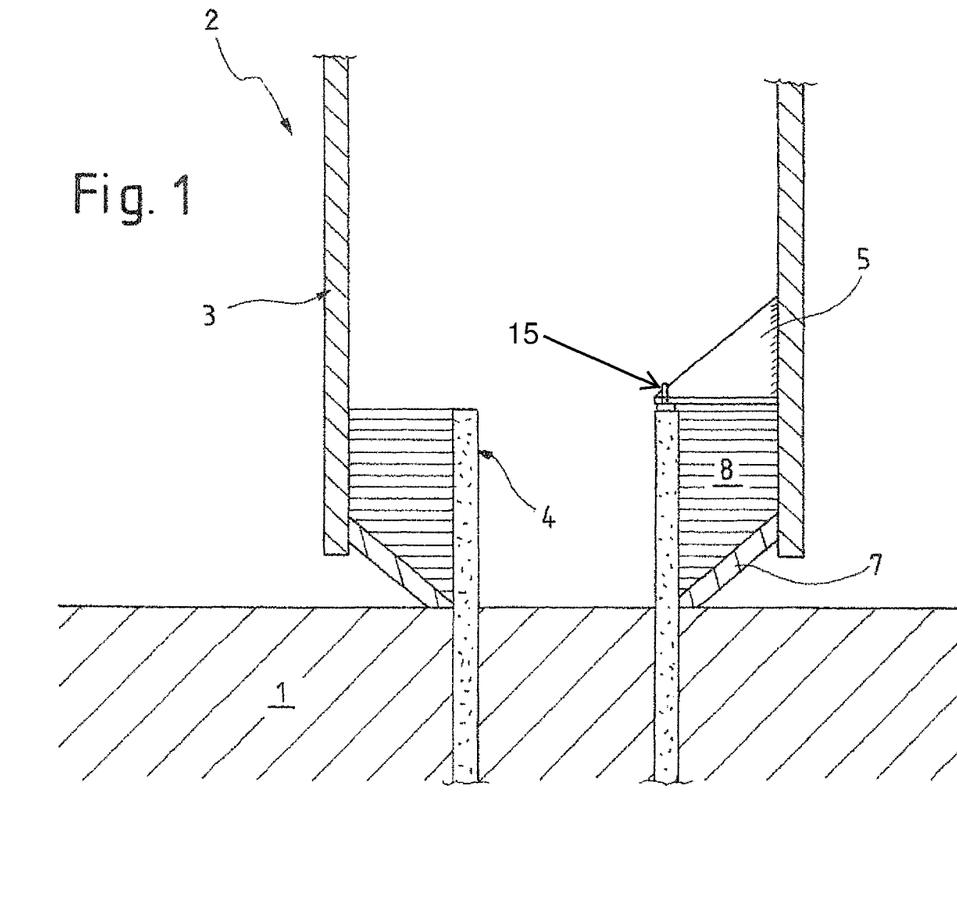
FIG. 1 shows a sectional view through a connection profile of a tower structure in the region of the foundation of the latter, wherein the connection between the connection profile and a foundation pile relates to a first exemplary embodiment of the invention.

Reference will be made first of all to the exemplary embodiment according to FIG. 1. FIG. 1 shows a section through part of a tower structure 2 fastened in a foundation soil 1, wherein only the lowermost pipe segment 3 of the tower structure 2 is illustrated. This pipe segment 3 is designed in the form of the connection profile of the tower structure 2.

In the case of the exemplary embodiment described, at least the lower pipe segment 3 illustrated, and in the form of a connection profile, is designed in the form of the cylindrical steel pipe segment. The latter is anchored in the foundation soil 1 via a foundation pile 4. It is also the case that only part of the foundation pile 4 is illustrated. The foundation pile, which according to the invention is designed in the form of a flange-free, cylindrical steel profile, has been driven into the foundation soil 1 by means of vibration and/or driving rams.

In the case of that exemplary embodiment of the invention which is illustrated in FIG. 1, the foundation pile 4 has a smaller diameter than the pipe segment 3, which may be designed in the form of part of a so-called monopile tower structure for accommodating a wind-power generator. The pipe segment 3 may have, for example, a conventional diameter of approximately 4 to 5 meters.

The foundation pile 4 is fixed in the foundation soil 1 over a significant part of its length, a relatively small part of its length projects beyond the foundation soil 1.

The pipe segment 3 has been arranged concentrically and coaxially in relation to the foundation pile 4 and has been set down on the foundation pile 4 for example via supporting brackets 5 on the inner circumference of the pipe segment. The illustration according to FIG. 1 depicts just one supporting bracket 5, but expediently at least three supporting brackets 5 are arranged at equal distances from one another, and at the same height, on the inner circumference of the pipe segment 3. For the purpose of leveling the pipe segment 3 in relation to the foundation pile 4, one or more spacers 15 may be arranged between the supporting brackets 5 and the end surface of the foundation pile 4.

The pipe segment 3 is supported on the foundation pile 4 such that the segment has its free end arranged at a distance from the foundation soil 1. An annular space 6 forms between the pipe segment 3 and the foundation pile 4 and, once the pipe segment 3 has been oriented in relation to the foundation pile 4, said annular space has been filled with a settable casting compound 8. For this purpose, the lower, free end of the pipe segment 3 is closed by means of an inwardly directed, encircling sealing lip 7. The casting compound 8 has been introduced from above into the pipe segment 3, or into the annular space 6 between the pipe segment 3 and the foundation pile 4, and the sealing lip 7 prevents the casting compound 8 from escaping before it sets.

Once the casting compound 8 has set, it is then possible for further segments of the tower structure 2 to be positioned on the pipe segment 3. The segments of the tower structure 2 are preferably flanged to one another via internally encircling flange connections. For reasons of simplification, FIG. 1 does not illustrate the continued progression of the tower structure 2.

Figure 2:
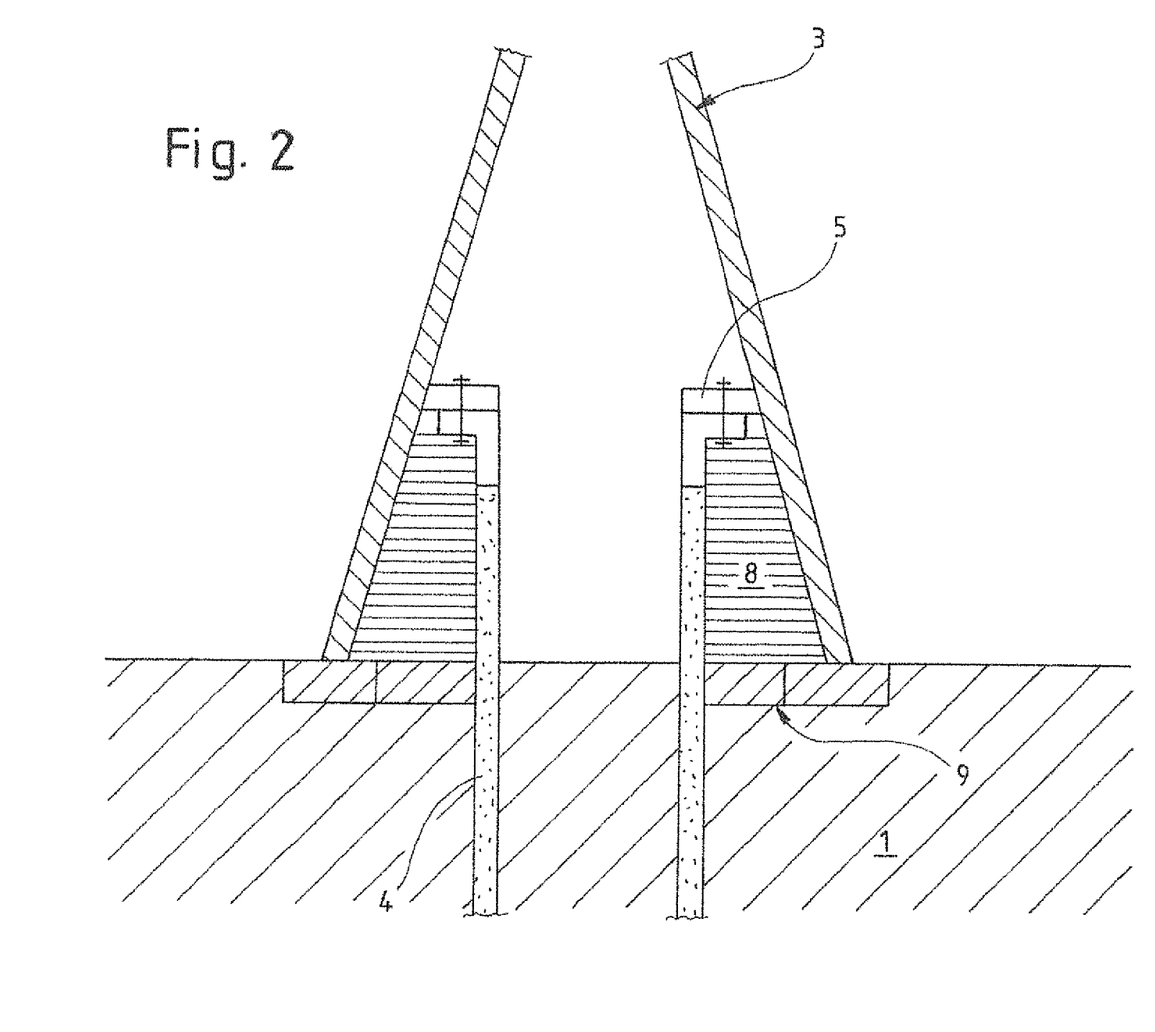
FIG. 2 shows a second variant of the connection between the tower structure and the foundation according to the invention.

FIG. 2 shows a second exemplary embodiment of a tower structure 2 according to the invention. In the following figures, like components are provided with like reference signs.

In the case of the exemplary embodiment illustrated in FIG. 2, the pipe segment 3 of the tower structure 2 has a conical cross section. The pipe segment widens in the direction of its standing surface. Furthermore, the pipe segment 3 is positioned on a foundation plinth 9, which can comprise various plinth elements arranged at a distance from one another, but may also be designed in the form of a single-piece, annular plinth element. The foundation plinth 9 serves only for supporting the pipe segment on a temporary basis. In the case of this variant of the foundation pile, the pipe segment 3 is likewise arranged concentrically and coaxially in relation to the foundation pile 4 driven into the foundation soil 1. The annular space 6 between the pipe segment 3 and the foundation pile 4 is likewise filled with a settable casting compound 8.

In the case of the pipe segment 3 being supported on the foundation soil, load dissipation takes place, first of all, via the foundation plinth 9 and, if appropriate, via supporting brackets 5 provided in addition on the inner circumference of the pipe segment 3. When the tower structure 2 is being erected, these temporary supporting measures absorb only the weight of the pipe segment 3. When the casting compound 8 has set, further construction takes place on the pipe segment until, finally, for example a wind-power generator is positioned on the tower structure 2. The load dissipation of the entire mass of the tower structure 2 then takes place via the surface friction between the pipe segment 3 and the casting compound 8 and between the casting compound 8 and the foundation pile 4. It is therefore the case that the foundation plinth 9 and the supporting brackets 5 need only be designed for a small, axially acting partial load.

As an alternative, provision is made for the foundation plinth 9 to be designed for the actual operating loads.

Since, in the case of the exemplary embodiment according to FIG. 2, the pipe segment 3 immediately adjoins the foundation soil 1, there is no need for separate sealing measures to prevent the casting compound from escaping.

Figure 3:
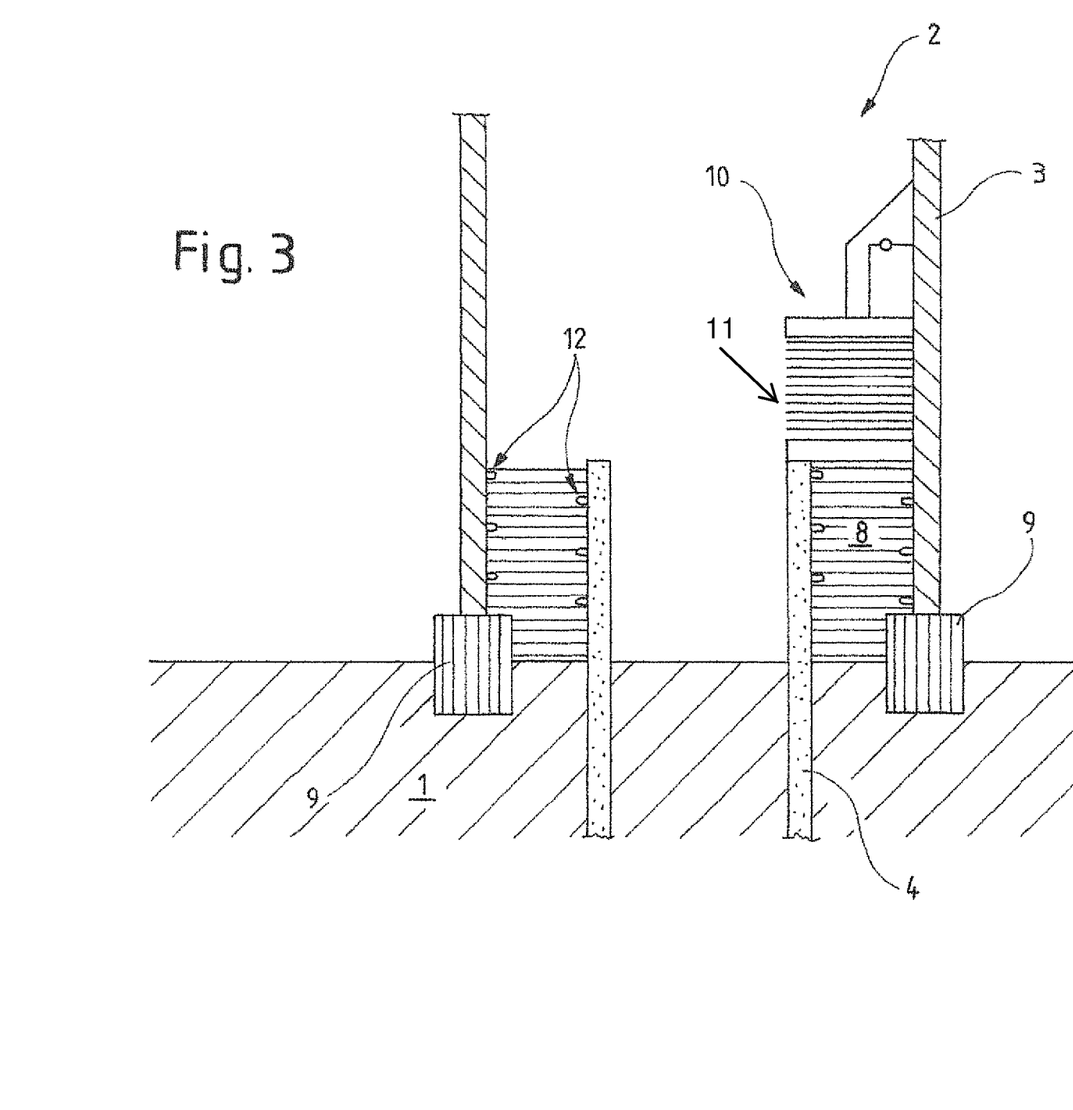
FIG. 3 shows a further variant of the connection between the tower structure and the foundation.

A further variant of the tower structure according to the invention is illustrated in FIG. 3. This variant corresponds essentially to the variant illustrated in FIG. 2, the pipe segment 3 being designed in the form of a cylindrical steel pipe segment and being supported on the foundation soil likewise via foundation plinths 9. It is also the case that a plurality of supporting bearings 10 are fastened on the inner circumference of the pipe segment 3, said supporting bearings 10 being supported on the foundation pile 4 and being of height-adjustable design for the purpose of adjusting the pipe segment 3. For reasons of simplification, the drawing illustrates just a single supporting bearing 10, which is in a number of parts and provides for height compensation by means of so-called shims 11.

In order to increase the surface friction between the pipe segment 3 and the foundation pile 4, Scheer dowels 12 are provided both on the inside of the pipe segment 3 and on the outside of the foundation pile 4.

Figure 4:
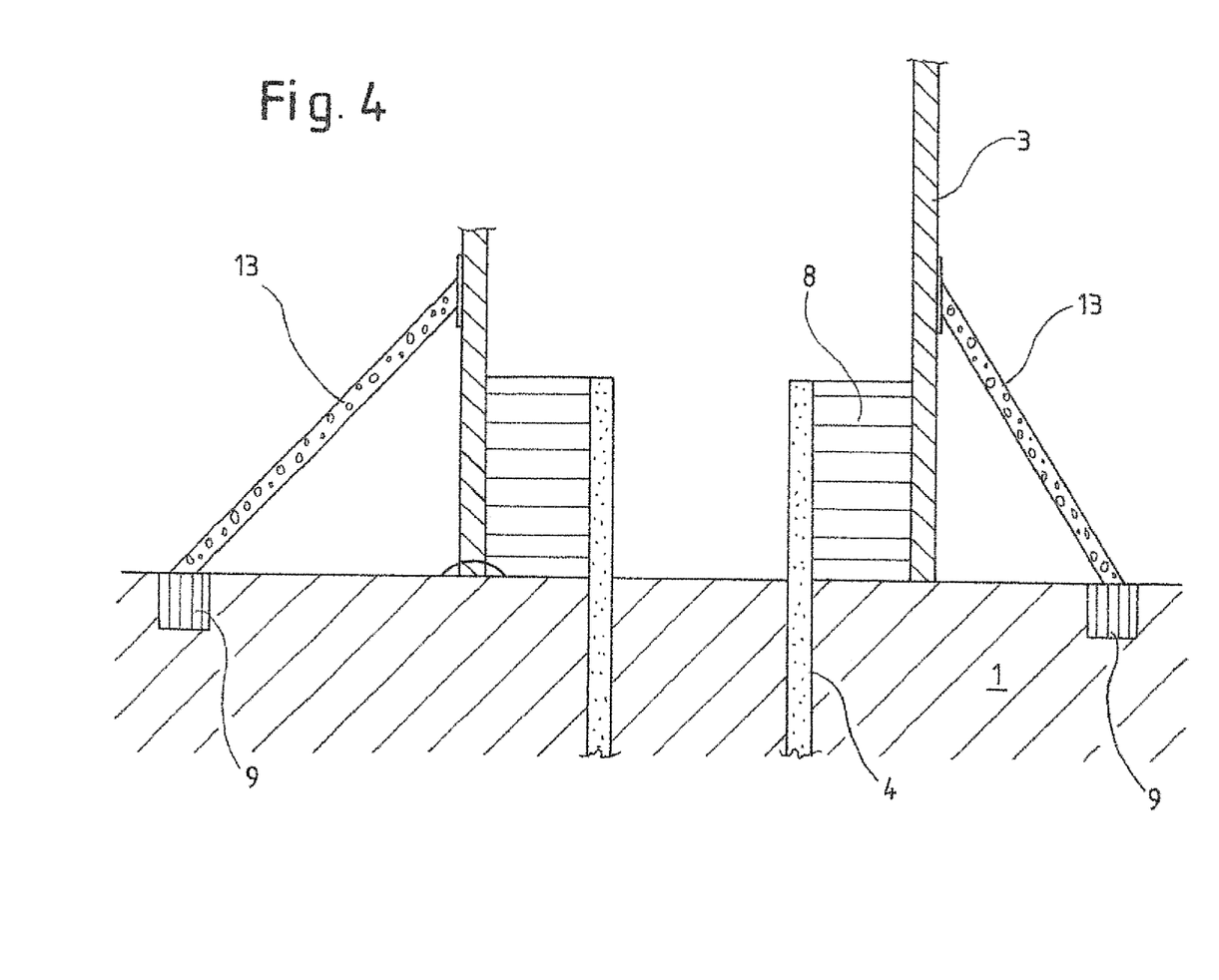
FIG. 4 shows a fourth variant of the foundation of the tower structure according to the invention.

In the case of the exemplary embodiment illustrated in FIG. 4, the pipe segment is set down directly on the foundation soil 1. Moreover, the pipe segment 3 is of cylindrical design and forms an annular space 6, in the manner described above, with the foundation pile 4. The pipe segment 3 is supported temporarily via abutments 13, which are arranged on the outer circumference of the pipe segment 3 and, for their part, are supported on foundation plinths 9. Instead of abutments 13 which are supported at discrete points on the outer circumference of the pipe segment, it is also possible for an encircling supporting collar to surround the pipe segment 3 in full. The abutments 13 are designed in the form of supports or struts which extend obliquely from the foundation soil 1 in the direction of the pipe segment 3 and, rather than being connected for example to the pipe segment 3, are merely supported against said pipe segment 3. The abutments 13 may be formed from concrete or steel, and they may also, if appropriate, be of length-adjustable design.

Figure 5A:
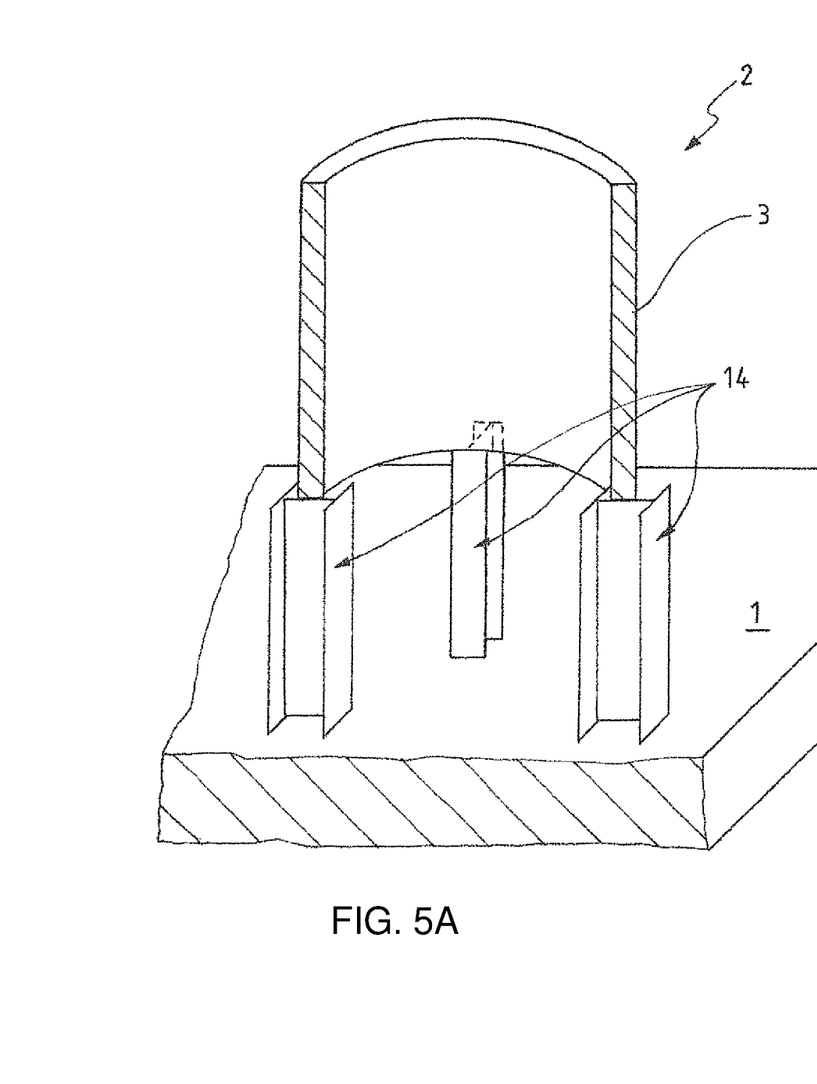
FIGS. 5A and 5B show a fifth variant of the foundation of the tower structure according to the invention.
Figure 5B:
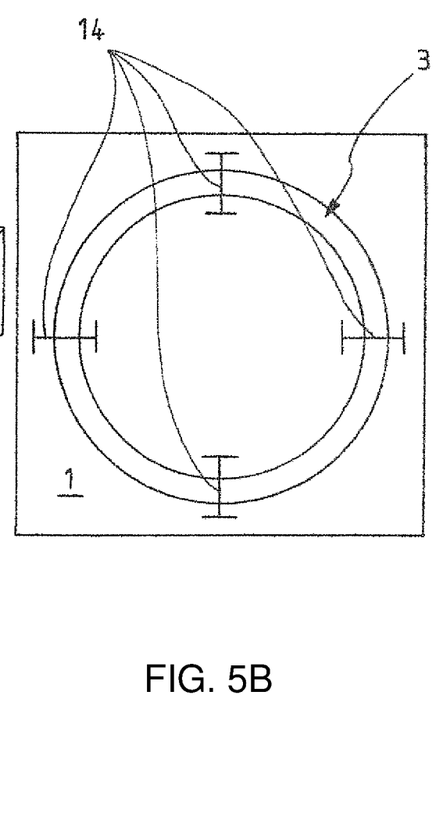

A further variant of the method is illustrated in FIGS. 5A and 5B, wherein FIG. 5A illustrates a perspective view, partly in section, of the tower structure 2 in the region of the lower pipe segment and FIG. 5B shows a plan view of the arrangement according to FIG. 5A.

Instead of a single foundation pile 4, in the case of this variant of the method, a number of sheet-pile-wall segments 14, in the form of I-shaped profile foundation piles, have been driven into the foundation soil 1 over a circular arc. The pipe segment 3 is set down, or supported, on the end surfaces of the sheet-pile-wall segments 14, so that then part of the pipe segment is filled with a settable casting compound. In the case of the exemplary embodiment according to FIGS. 5A and 5B, the pipe segment 3 can be carried by the sheet-pile-wall segments 14 at a distance from the foundation soil 1. In this case, an additional temporary sealing is provided between the pipe segment 3 and the foundation soil 1, in order to prevent the situation where the casting compound introduced into the pipe segment 3 does run out. As an alternative, it is possible for the sheet-pile-wall segments 14 to have been driven into the foundation soil 1 to the extent where the pipe segment 3 adjoins the foundation soil 1 such that no casting compound escapes.

In the case of the exemplary embodiment illustrated in FIGS. 5A and 5B, the sheet-pile-wall segments 14 are arranged at comparatively large distances from one another over a circular arc. A total of four sheet-pile-wall segments 14 are provided, the profile crosspieces of said segments each being oriented radially outward.

As an alternative, it is also possible for a multiplicity of foundation piles 4 to be arranged, for example in the form of sheet-pile-wall segments 14 or differently designed profiles, over an essentially closed circular arc, wherein the pipe segment 3 can surround said circular arc so that an annular space is formed between the foundation piles 4, or sheet-pile-wall segments 14, and the pipe segment 3, said annular space then being filled with the settable casting compound.

LIST OF REFERENCE SIGNS

1 Foundation soil
2 Tower structure
3 Pipe segment
4 Foundation pile
5 Supporting brackets
6 Annular space
7 Sealing lip
8 Casting compound
9 Foundation plinth
10 Supporting bearing
11 Shims
12 Scheer dowel
13 Abutment
14 Sheet-pile-wall segments

What is claimed is:

1. A method for constructing a foundation for a tower structure having at least one structure-side connection profile in the form of a pipe segment, wherein the method comprises the following steps:
    supplying a number of foundation piles selected from a group comprising tubular profiles, T-shaped profiles, I-shaped profiles, Z-shaped profiles or other sheet-pile-wall segments;
    driving the number of foundation piles into a load-bearing foundation soil, wherein the driving-in method is selected from a group comprising introduction by vibration, ramming or drilling or combinations thereof, wherein the number of foundation piles are driven into the foundation soil over a circular arc, the circular arc arranged coaxially in relation to a longitudinal axis of the tower structure;
    orienting and securing the pipe segment coaxially in relation to the circular arc of the number of foundation piles;
    partially filling the pipe segment with a settable casting compound; and
    wherein the pipe segment is supported on the number of foundation piles prior to partially filling the pipe segment with the settable casting compound.

2. The method as claimed in claim 1, wherein the pipe segment is oriented and secured coaxially in relation to the circular arc of the foundation piles such that a center of the pipe segment is coaxial with the center of the circular arc of the number of foundation piles, and the settable casting compound has an annular shape.

3. The method as claimed in claim 1, further comprising at least one supporting bracket, which supports the pipe segment on at least one of the foundation piles of the number of foundation piles.

4. The method as claimed in claim 1, wherein the number of foundation piles are each of a flange-free design.

5. The method as claimed in claim 1, further comprising at least one spacer which orientates the pipe segment.

6. The method as claimed in claim 1, wherein the pipe segment and the circular arc each have a diameter, and the diameter of the pipe segment is greater than the diameter of the circular arc of the number of foundation piles.

7. The method as claimed in claim 1, wherein the foundation is constructed onshore.

8. The method as claimed in claim 1, wherein the pipe segment is supported on the number of foundation piles at a distance from the foundation soil.

9. An onshore tower structure comprising:
    a structure-side connection profile in the form of a pipe segment, and
    a number of foundation piles driven into a foundation soil and selected from a group comprising tubular profiles, T-shaped profiles, I-shaped profiles, Z-shaped profiles or other sheet-pile-wall segments,
    wherein the pipe segment and the number of foundation piles surround one another to form an annular space, and
    wherein the pipe segment is at least partially filled with a set casting compound, and
    wherein the pipe segment is fastened on at least one of the number of foundation piles at a distance from the foundation soil and/or the pipe segment is supported on at least one of the number of foundation piles via at least one supporting bracket.

10. The onshore structure as claimed in claim 9, wherein the number of foundation piles are each of a flange-free design.

11. A method for constructing a foundation for a tower structure having at least one structure-side connection profile in the form of a pipe segment, wherein the method comprises the following steps:
- supplying a number of foundation piles selected from a group comprising tubular profiles, T-shaped profiles, I-shaped profiles, Z-shaped profiles or other sheet-pile-wall segments;
- driving the number of foundation piles into a load-bearing foundation soil, wherein the driving-in method is selected from a group comprising introduction by vibration, ramming or drilling or combinations thereof, wherein the number of foundation piles are driven into the foundation soil over a circular arc, the circular arc arranged coaxially in relation to a longitudinal axis of the tower structure;
- orienting and securing the pipe segment coaxially in relation to the circular arc of the number of foundation piles;
- partially filling the pipe segment with a settable casting compound; and
- wherein the pipe segment is supported on the number of foundation piles at a distance from the foundation soil.

* * * * *